US012256263B2

(12) United States Patent
Puente Pestaña et al.

(10) Patent No.: US 12,256,263 B2
(45) Date of Patent: Mar. 18, 2025

(54) MACHINE LEARNING BASED ADAPTATION OF QoE CONTROL POLICY

(71) Applicant: Telefonaktiebolaget LM Ericsson (publ), Stockholm (SE)

(72) Inventors: Miguel Angel Puente Pestaña, Madrid (ES); Miguel Angel Muñoz De La Torre Alonso, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 477 days.

(21) Appl. No.: 17/628,616

(22) PCT Filed: Sep. 10, 2019

(86) PCT No.: PCT/EP2019/074093
§ 371 (c)(1),
(2) Date: Jan. 20, 2022

(87) PCT Pub. No.: WO2021/013368
PCT Pub. Date: Jan. 28, 2021

(65) Prior Publication Data
US 2023/0232272 A1    Jul. 20, 2023

(30) Foreign Application Priority Data
Jul. 25, 2019   (EP) .................................... 19382637

(51) Int. Cl.
*H04W 28/02*    (2009.01)
*H04W 24/08*    (2009.01)
(52) U.S. Cl.
CPC ....... *H04W 28/0268* (2013.01); *H04W 24/08* (2013.01)

(58) Field of Classification Search
None
See application file for complete search history.

(56) References Cited

U.S. PATENT DOCUMENTS

2015/0089026 A1\*  3/2015  Payette ................ H04L 67/141
                                                              709/219
2015/0304737 A1   10/2015  Franklin et al.
(Continued)

FOREIGN PATENT DOCUMENTS

WO     2014127812 A1    8/2014
WO     2016091292 A1    6/2016

OTHER PUBLICATIONS

International Search Report and Written Opinion dated Mar. 18, 2020 for International Application No. PCT/EP2019074093 filed Sep. 10, 2019, consisting of 13 pages.
(Continued)

*Primary Examiner* — Alex Skripnikov
*Assistant Examiner* — Angelie T Ngo
(74) *Attorney, Agent, or Firm* — Weisberg I.P. Law, P.A.

(57) ABSTRACT

A node of a wireless communication network receives first data indicating a desired quality of experience level for user data traffic of a user of the wireless communication network. Based on a control policy and the desired quality of experience level, the node determines a rule for controlling the user data traffic. Further, the node obtains second data indicating an estimated quality of experience level for the user data traffic subject to control according to the rule. Based on the first data and the second data, the node adapts the control policy, e.g., using a reinforcement learning, RL, mechanism.

20 Claims, 11 Drawing Sheets

(56) References Cited

U.S. PATENT DOCUMENTS

2017/0332282 A1* 11/2017 Dao .................. H04L 1/0002
2019/0222491 A1    7/2019 Tomkins et al.
2022/0116814 A1*  4/2022 Di Girolamo ........ H04W 4/027

OTHER PUBLICATIONS

3GPP TS 23.203 V16.1.0 3rd Generation Partnership Project; Technical Specification Group Services and System Aspects; Policy and charging control architecture(Release 16); Jun. 2019, consisting of 263 pages.

3GPP TS 29.212 V16.0.0 3rd Generation Partnership Project; Technical Specification Group Core Network and Terminals; Policy and Charging Control (PCC); Reference points (Release 16); Jun. 2019, consisting of 285 pages.

3GPP TS 23.501 V16.1.0 3rd Generation Partnership Project; Technical Specification Group Services and System Aspects; System Architecture for the 5G System; Stage 2 (Release 16); Jun. 2019, consisting of 368 pages.

* cited by examiner

MACHINE LEARNING BASED ADAPTATION OF QoE CONTROL POLICY

CROSS-REFERENCE TO RELATED APPLICATIONS

This application is a Submission Under 35 U.S.C. § 371 for U.S. National Stage Patent Application of International Application No.: PCT/EP2019/074093, filed Sep. 10, 2019 entitled "MACHINE LEARNING BASED ADAPTATION OF QOE CONTROL POLICY," which claims priority to European Application No.: 19382637.7, filed Jul. 25, 2019, the entireties of both of which are incorporated herein by reference.

TECHNICAL FIELD

The present invention relates to methods for controlling transmission of data in a wireless communication network and to corresponding devices, systems, and computer programs.

BACKGROUND

In wireless communication networks, e.g., as specified by 3GPP ($3^{rd}$ Generation Partnership Project), it is known to control user data traffic with the aim of providing a certain QoS (Quality of Service). For example, the LTE (Long Term Evolution) or the NR (New Radio) technology specified by 3GPP provide a PCC (Policy and Charging Control) architecture which enables control of the user data traffic by enforcing QoS rules. Details concerning the PCC architecture and its functionalities can for example be found in 3GPP TS 23.203 V16.1 (2019-06), 3GPP TS 29.212 V16.0 (2019-06), and 3GPP TS 23.501 (2019-06).

However, the existing PCC mechanisms have some limitations. For example, while it is possible to set-up user data traffic session with a specific QoS, e.g., in terms of a guaranteed bitrate, such settings are static and do not directly map to an actual QoE (Quality of Experience) of a user. Further, in typical scenarios the operator of the wireless communication network has no access to the actual QoE of the user, which makes it difficult to find appropriate settings of QoS parameters. Further, characteristics of the network and/or of the user data traffic may change, so that the same settings of QoS parameters may result in different QoE of the user. The existing PCC mechanisms do not allow for efficiently addressing such dynamic changes.

Accordingly, there is a need for techniques which allow for efficiently controlling user data traffic in view of providing a desired QoE of a user.

SUMMARY

According to an embodiment, a method of controlling user data traffic in a wireless communication network is provided. According to the method, a node of the wireless communication network receives first data indicating a desired quality of experience level for user data traffic of a user of the wireless communication network. Based on a control policy and the desired quality of experience level, the node determines a rule for controlling the user data traffic. Further, the node obtains second data indicating an estimated quality of experience level for the user data traffic subject to control according to the rule. Based on the first data and the second data, the node adapts the control policy.

According to a further embodiment, a method of controlling user data traffic in a wireless communication network is provided. According to the method, a node of the wireless communication network provides data to a further node of the wireless communication network. The data indicate a desired quality of experience level for user data traffic of a user of the wireless communication network. Further, the node provides further data to the further node. The further data indicate an actual quality of experience level for the user data traffic.

According to a further embodiment, a node for a wireless communication network is provided. The node is configured to receive first data indicating a desired quality of experience level for user data traffic of a user of the wireless communication network. Further, the node is configured to determine, based on a control policy and the desired quality of experience level, a rule for controlling the user data traffic. Further, the node is configured to obtain second data indicating an estimated quality of experience level for the user data traffic subject to control according to the rule. Further, the node is configured to adapt the control policy based on the first data and the second data.

According to a further embodiment, a node for a wireless communication network is provided. The node comprises at least one processor and a memory. The memory contains instructions executable by said at least one processor, whereby the node is operative to receive first data indicating a desired quality of experience level for user data traffic of a user of the wireless communication network. Further, the memory contains instructions executable by said at least one processor, whereby the node is operative to determine, based on a control policy and the desired quality of experience level, a rule for controlling the user data traffic. Further, the memory contains instructions executable by said at least one processor, whereby the node is operative to obtain second data indicating an estimated quality of experience level for the user data traffic subject to control according to the rule. Further, the node is configured to adapt the control policy based on the first data and the second data.

According to a further embodiment, a node for a wireless communication network is provided. The node is configured to provide, to a further node of the wireless communication network, data indicating a desired quality of experience level for user data traffic of a user of the wireless communication network. Further, the node is configured to provide, to the further node, further data indicating an actual quality of experience level for the user data traffic.

According to a further embodiment, a node for a wireless communication network is provided. The node comprises at least one processor and a memory. The memory contains instructions executable by said at least one processor, whereby the node is operative to provide, to a further node of the wireless communication network, data indicating a desired quality of experience level for user data traffic of a user of the wireless communication network. Further, the memory contains instructions executable by said at least one processor, whereby the node is operative to provide, to the further node, further data indicating an actual quality of experience level for the user data traffic.

According to a further embodiment of the invention, a computer program or computer program product is provided, e.g., in the form of a non-transitory storage medium, which comprises program code to be executed by at least one processor of a node for a wireless communication network. Execution of the program code causes the node to receive first data indicating a desired quality of experience level for user data traffic of a user of the wireless communication network. Further, execution of the program code causes the node to determine, based on a control policy and the desired quality of experience level, a rule for controlling the user data traffic. Further, execution of the program code causes the node to obtain second data indicating an estimated quality of experience level for the user data traffic subject to control according to the rule. Further, the node is configured to adapt the control policy based on the first data and the second data.

According to a further embodiment of the invention, a computer program or computer program product is provided, e.g., in the form of a non-transitory storage medium, which comprises program code to be executed by at least one processor of a node for a wireless communication network. Execution of the program code causes the node to provide, to a further node of the wireless communication network, data indicating a desired quality of experience level for user data traffic of a user of the wireless communication network. Further, execution of the program code causes the node to provide, to the further node, further data indicating an actual quality of experience level for the user data traffic.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to controlling data user data traffic in a wireless communication network.

The wireless communication network may be based on various radio technologies, e.g., the NR radio technology, the LTE radio technology, the UMTS radio technology, or combinations of these technologies.

The illustrated concepts aim at efficiently controlling the user data traffic with respect to QoE of a user. As further explained below, this may be achieved by applying a machine learning processes in a network node. For this purpose, the network node is provided with information to enable the machine learning processes, in particular data indicating a desired or wanted QoE (in the following also denoted as wQoE) and optionally also data indicating an actual QoE (in the following also denoted as aQoE) as measured at endpoints transmitting and receiving the user data traffic, e.g., a UE (user equipment) and a service provider node. The machine learning processes may be based on an RL (reinforcement learning) algorithm. However, other machine learning algorithms, such as supervised learning or unsupervised learning, could be used as well.

Figure 1:
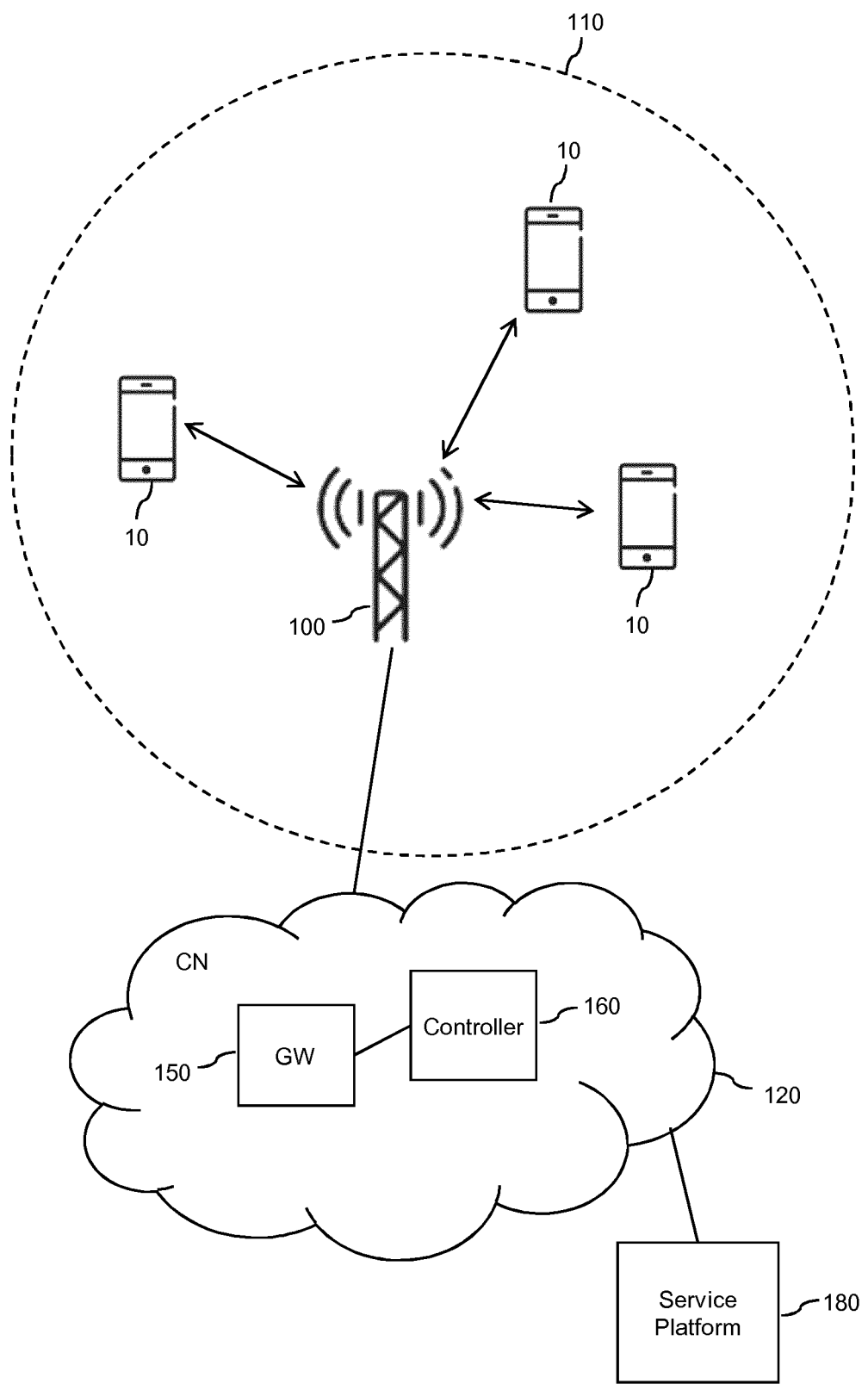
FIG. 1 schematically illustrates an exemplary wireless communication network scenario according to an embodiment of the invention.

FIG. 1 illustrates exemplary structures of the wireless communication network. In particular, FIG. 1 shows multiple UEs 10 in a cell 110 of the wireless communication network. The cell 110 is assumed to be served by an access node 100, e.g., a gNB of the NR technology, an eNB of the LTE technology, or an NB of the UMTS technology. Further, FIG. 1 illustrates a core network (CN) 120 of the wireless communication network. The CN 120 is illustrated as including a GW (gateway) 150 and a controller 160. The GW 150 is responsible for handling user data traffic of the UEs 10, e.g., by forwarding user data traffic from a UE 10 to a network destination or by forwarding user data traffic from a network source to a UE 10. Here, the network destination may correspond to another UE 10, to an internal node of the wireless communication network, or to an external node which is connected to the wireless communication network. Similarly, the network source may correspond to another UE 10, to an internal node of the wireless communication network, or to an external node which is connected to the wireless communication network. The controller 160 may in turn be responsible for controlling the user data traffic with respect to QoE of users associated with the UEs 10.

As illustrated by double-headed arrows, the access node 100 may send DL (downlink) transmissions to the UEs, and the UEs may send UL (uplink) transmissions to the access node 100. The DL transmissions and UL transmissions may be used to provide various kinds of services to the UEs, e.g., a voice service, a multimedia service, or a data service. Such services may be hosted in the CN 120, e.g., by a corresponding network node. Further, such services may be hosted externally, e.g., by an AF (application function) connected to the CN 120. By way of example, FIG. 1 illustrates a service platform 180 provided outside the wireless communication network. The service platform 180 could for example connect through the Internet or some other wide area communication network to the CN 120. The service platform 180 may be based on a server or a cloud computing system. The service platform 180 may include or be associated with one or more AFs that enable interaction of the service platform 180 with the CN 120. The service platform 180 may provide one or more services to the UEs 10, corresponding to one or more applications. These services or applications may generate the user data traffic conveyed by the DL transmissions and/or the UL transmissions between the access node 100 and the respective UE 10. Accordingly, the service platform 180 may include or correspond to the above-mentioned network destination and/or network source for the user data traffic.

It is noted that the wireless communication network may actually include more access nodes for serving multiple cells in a similar way as explained for the access node 100 and the cell 110.

Figure 2:
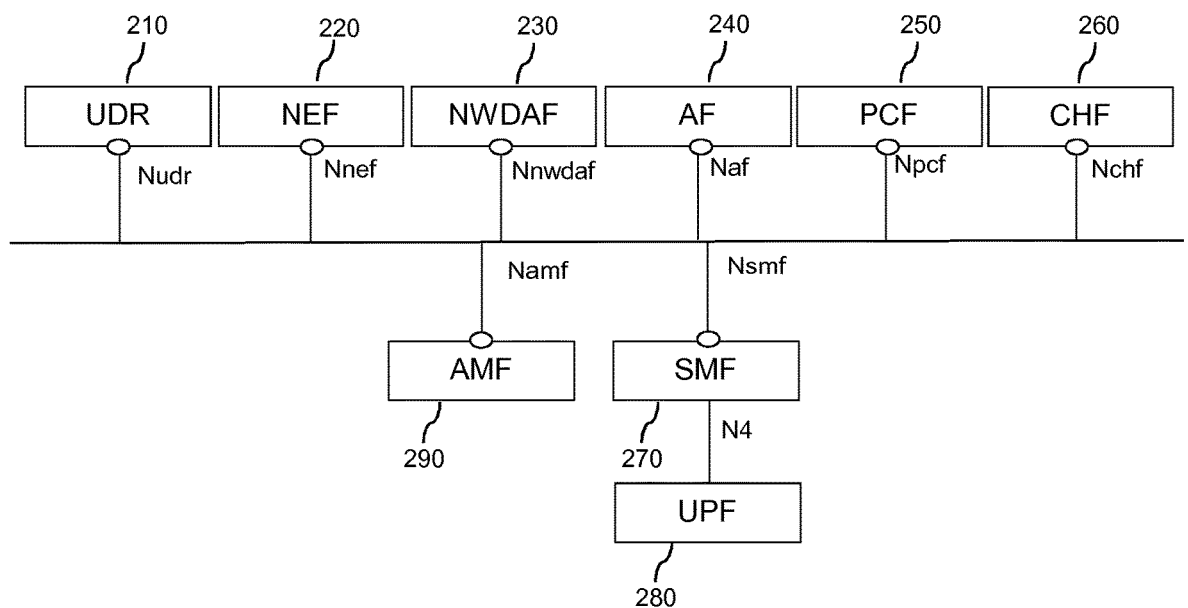
FIG. 2 schematically illustrates an exemplary network architecture as used according to an embodiment of the invention.

As mentioned above, the wireless communication network may be based on the NR technology. FIG. 2 illustrates elements of a 5G ($5^{th}$ Generation) CN architecture which a used in connection with the NR technology. Specifically, FIG. 2 illustrates a UDR (Unified Data Repository) 210, an NEF (Network Exposure Function) 220, an NWDAF (Network Data Analytics Function) 230, an AF (Application Function) 240, a PCF (Policy Control Function) 250, a CHF (Charging Function) 260, an SMF (Session Management Function) 270, a UPF (User Plane Function) 280, and an AMF (Access Management Function) 290. Further, FIG. 2 also illustrates interfaces (also referred to as reference points) between these node. Specifically, these interfaces include an Nudr reference point with respect to the UDR 210, an Nnef reference point with respect to the NEF 220, an Nnwdaf reference point with respect to the NWDAF 230, an Naf reference point with respect to the AF 240, an Npcf reference point with respect to the PCF 250, an Nchf reference point with respect to the CHF 260, an Nsmf reference point with respect to the SMF 270, an N4 reference point between the SMF 270 and the UPF 280, and an Namf reference point with respect to the AMF 290.

In the context of the illustrated concepts functionalities of the AF 240 may include interaction with the CN in order to provide one or more services. This may specifically include controlling of traffic handling with respect to QoE, by providing the CN with information on the desired QoE and optionally the actual QoE experienced by the user.

In the context of the illustrated concepts functionalities of the NEF 220 may include exposure of capabilities and events. Specifically, capabilities of network nodes and events may be securely exposed to 3rd party nodes, such as a $3^{rd}$ party AF 240. As further explained below, the functionalities of the NEF 220 may for example be used when establishing a user data session for a certain AF, which requires a certain QoE. Further, the NEF 220 may support secure provision of information from external nodes or applications to the wireless communication network and translate between network-external and network-internal information.

In the context of the illustrated concepts functionalities of the PCF 250 may include providing of policy rules to control plane node(s) to enforce them. Specifically, the PCF 250 may support retrieving information on QoS requested for user data traffic from the NEF 220 and installing corresponding PCC rule/s with the corresponding QoS enforcement actions towards the SMF 270.

In the context of the illustrated concepts functionalities of the UPF 280 may include: acting as a point of interconnect to an external data network, e.g., the Internet, packet routing and forwarding, packet inspection, (e.g. application detection based on service data flow template and optionally one or more PFDs (Packet Flow Descriptions) or one or more PDRs (Packet Detection Rules) provided by the SMF 270, user plane policy rule enforcement, e.g., by gating, redirection, traffic steering, and user plane QoS handling, e.g., by rate enforcement or QoS marking.

In the context of the illustrated concepts functionalities of the SMF 270 may include obtaining application-specific PCC rules from the PCF 250. The SMF 270 may also be responsible for providing and activating one or more PDRs (Packet Detection Rules) in the UPF 280 and/or for providing and activating one or more QERs (QoS Enforcement Rules) in the UPF 280. The PDR(s) may be used to identify user data traffic of a certain application and the QER(s) may then be used to indicate the requested QoS handling to the UPF 280.

Further details concerning functionalities of the illustrated nodes and reference points can for example be found in 3GPP TS 23.501 V16.1.0.

It is noted that while FIG. 2 illustrates typical elements of a 5G CN, not all the illustrated elements are actually required for implementing the illustrated concepts. Further, it is noted that in other implementations, e.g., using a 4G ($4^{th}$ Generation) or a 3G ($3^{rd}$ Generation) CN architecture, the elements of FIG. 2 could be replaced having other designations, but similar functionalities. For example, in the illustrated concepts the GW 150 of FIG. 1 could be implemented by the UPF 280, and the controller 160 could be implemented by the SMF 270 and/or the PCF 250. In the case of a 4G CN architecture, the GW 150 could be implemented by a PGW (Packet Data Gateway) and the controller 160 could be implemented by a PCRF (Policy and Charging Rules Function). In the case of a 3G CN architecture, the GW 150 could be implemented by a GGSN (General Packet Data Service Gateway Support Node) and the controller 160 could be implemented by a PCRF.

Figure 3:
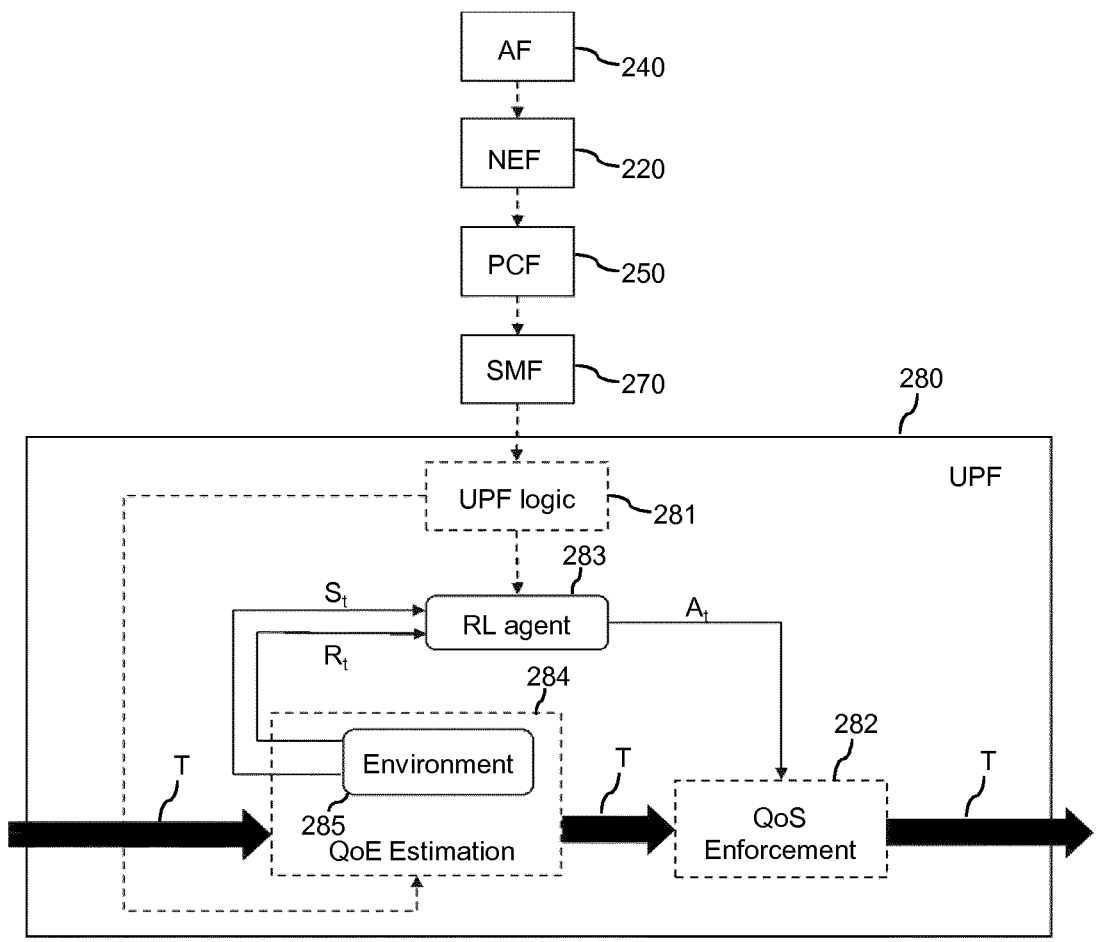
FIG. 3 schematically illustrates machine-learning based adaptation of a QoE policy according to an embodiment of the invention.

FIG. 3 further illustrates implementation of the illustrated concepts in an architecture as illustrated in FIG. 2 and using RL processes in the UPF 280. As illustrated in FIG. 3, the UPF 280 forwards user data traffic T. In the illustrated example, the UPF 280 is provided with a UPF logic 281, a QoS enforcement module 282, an RL agent 283, and a QoE estimation module 284. The QoE estimation module estimates the QoE for the user by monitoring the user data traffic T. This may be accomplished in a user-specific and application-specific manner. The QoE may for example be estimated in terms of a MOS (Mean Opinion Square) level. This may for example be achieved by detecting characteristics of the monitored user data traffic and determining the estimated QoE from a mapping of the characteristics to MOS levels. This mapping may be based on known correlations of characteristics to MOS levels as actually measured, e.g., using user ratings or the like. The estimated QoE constitutes an environment 285 for the RL processes.

In the illustrated example, the RL processes involve that the RL agent 283 learns how to behave with respect to the environment 285 by selecting actions and observing results of the actions. Each of the actions correspond to one or more QoS rules enforced by the QoS enforcement module 282. In the following, the actions will therefore also be referred to as QoS enforcement actions. The results of the QoS enforcement actions correspond to changes of the estimated QoE. In response to selecting a QoS enforcement action, the RL agent 283 receives information on a reward. The reward may be regarded as a measure of how desirable the state of the environment 285 is. The RL agent 283 may then execute an algorithm in order to identify and learn QoS enforcement actions that maximize a cumulative reward function in the long term. It is noted that the RL agent 283 may operate on the basis of various kinds of RL algorithms, including brute-force type algorithms, value-function type algorithms, Monte-Carlo type algorithms, temporal-difference type algorithms, and direct-policy search type algorithms.

The environment 285 may be modeled as a Markov decision process (MDP). The MDP may use a finite set of states, also referred to as observation space, and a finite set of QoS enforcement actions, also referred to as action space, that lead to changes between the states. Interaction of the RL agent 283 with the environment 285 is assumed to occur in discrete time steps. At a given time step, denoted by t, the environment 285 is in some state, denoted by $S_t$, and the QoE estimation module 284 provides an observation of this state $S_t$, e.g., an estimated MOS level, and the corresponding reward, denoted by $R_t$, to the RL agent 283. The RL agent 285 may then choose a QoS enforcement action, denoted by $A_t$, that is available in the state $S_t$. The environment 285 reacts to the QoS enforcement action $A_t$ by transitioning to a new state, denoted as $S_{t+1}$. The new state $S_{t+1}$ may correspond to a QoE level which differs from the former state $S_t$. Information on the new state $S_{t+1}$ and the corresponding reward, denoted as $R_{t+1}$, are indicated to the RL agent 283, and the process may continue in an iterative manner.

By iterating the above process and observing the rewards, the RL agent 283 may learn an optimized policy that maps states to the QoS enforcement actions in such a way that the cumulative reward function gets maximized.

The RL agent 285 may operate in two different modes: an exploration mode and an exploitation mode. In the exploration mode the RL agent 285 may select QoS enforcement actions that do not follow the optimized policy, e.g. by selecting QoS enforcement actions randomly, using heuristic algorithms to select the QoS enforcement actions, or using more complex methods such as an epsilon-greedy algorithm. In the exploitation mode the RL agent 285 may select QoS enforcement actions according to the optimized policy learned in the exploration mode. The RL agent 285 may switch between the two modes with the aim balancing the benefit of utilizing an optimized policy against the chance of even further optimizing the policy.

The QoE estimation module 284 calculates the rewards as a function of the desired QoE (wQoE) and the estimated QoE. In some scenarios, the calculation of the rewards may also be based on the actually measured QoE (aQoE) and/or on various other parameters. As information on the desired QoE and optionally the actual QoE may be provided by the AF 240 and indicated via the NEF 220, PCF 250, and SMF 270 to the UPF 280. This may be accomplished upon PDU session establishment between the UE 10 and the wireless communication network.

In the UPF 280, information on the desired QoE is also provided to the RL agent 283. The RL agent 283 may use the desired QoE as a basis for determining the QoS enforcement action space, i.e., a set of QoS rules which can be applied by the QoS enforcement module.

An exemplary procedure for implementing the illustrated concepts may include the following sub-procedures:
1. The UPF 280 associates to the SMF 270 and indicates that it supports the RL-based QoE control, i.e., in the course of negotiating capabilities between the UPF 280 and the SMF 270.
2. A user, e.g., associated with one of the UEs 10, establishes a PDU session and the SMF 270 selects the UPF 280, which supports the capability of RL-based QoE control, for this PDU session.
3. The user starts a service provided by the AF 240. The AF 240 provides the wanted QoE for the service to the NEF 220. The NEF 220 forwards the wanted QoE to the PCF 250. The PCF 250 generates a PCC rule extended by the wanted QoE and installs the PCC rule in the SMF 270. The SMF 270 indicates the wanted QoE to the UPF 280.
4. The QoE estimation module 284 processes the user data traffic associated with the service and estimates the QoE and calculates the corresponding reward, e.g., based on the estimated QoE and the wanted QoE. Further, the QoE estimation module 284 indicates the state and the corresponding reward to the RL agent 283.
5. Based on the indicated state and reward, the RL agent 283 learns the effect of the past QoS enforcement action selections by the RL agent 283.
6. The RL agent selects a QoS enforcement action from the QoS enforcement action space. This selection is based on the wanted QoE, the indicated state, and the indicated reward. Further, this selection may depend a learned or pre-configured policy or on whether the RL agent is in the exploration mode or the exploitation mode.

Sub-procedures 4 to 6 may be iterated for learning an optimized policy for selection of QoS enforcement actions.

It is noted that while FIG. 3 assumes implementation of the illustrated concepts in a 5G context, corresponding functionalities could also be implemented in a 3G or 4G context, e.g., by providing a 3G GGSN or a 4G PGW with similar functionalities as described for the UPF 280.

Figure 4:
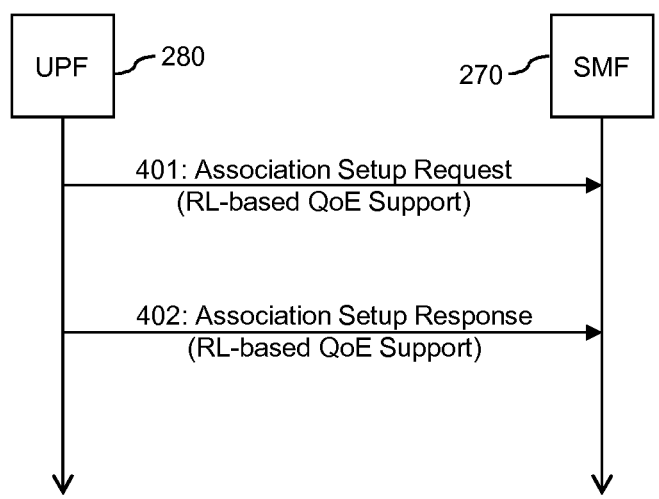
FIG. 4 illustrates an example of processes as utilized according to an embodiment of the invention.

FIG. 4 illustrates an example of processes which may be utilized in the illustrated concepts and involve the UPF 280 and the SMF 270. In the processes of FIG. 4, the UPF 280 and the SMF 270 negotiate capabilities. As illustrated, such processes may be used to inform the SMF 270 or other nodes that the UPF 280 supports the capability of RL-based QoE control. The processes of FIG. 4 may be performed when the UPF 280 is deployed in the wireless communication network or in response to deployment changes of the wireless communication network.

In the processes of FIG. 4, the UPF 280 sends an Association Setup Request 401 to the SMF 270. The Association Setup Request may be part of a PFCP (Packet Forwarding Control Protocol) Association Setup Procedure as specified in section 6.2.6 of 3GPP TS 29.244 V16.0.0 (2019-06). The Association Setup Request 401 indicates that the UPF 280 supports the capability of RL-based QoE control. Further, the Association Setup Request 401 may indicate other capabilities or features of the UPF 280.

The SMF 270 responds to the UPF 280 by sending an Association Setup Response 402. Similar to the Association Setup Request 401, the Association Setup Response may be part of the PFCP Association Setup Procedure. The Association Setup Response 402 indicates that the SMF 270 supports the capability of RL-based QoE control. Further, the Association Setup Response 402 may indicate other capabilities or features of the SMF 270.

It is noted that processes similar to those of FIG. 4 can also be initiated by the SMF 270. In such cases the SMF 270 could send an Association Setup Request indicating that the SMF 270 supports the capability of RL-based QoE control, and the UPF 280 respond by sending an Association Setup Response indicating that the UPF 280 supports the capability of RL-based QoE control. Further, it is noted that in a similar manner, the capability of RL-based QoE control could also be negotiated between other nodes, e.g., between the AF 240 and the NEF 220, between the NEF 220 and the PCF 250, and between the PCF 250 and the SMF 270. Further, the indicated capability may also be further propagated by the nodes.

Figure 5:
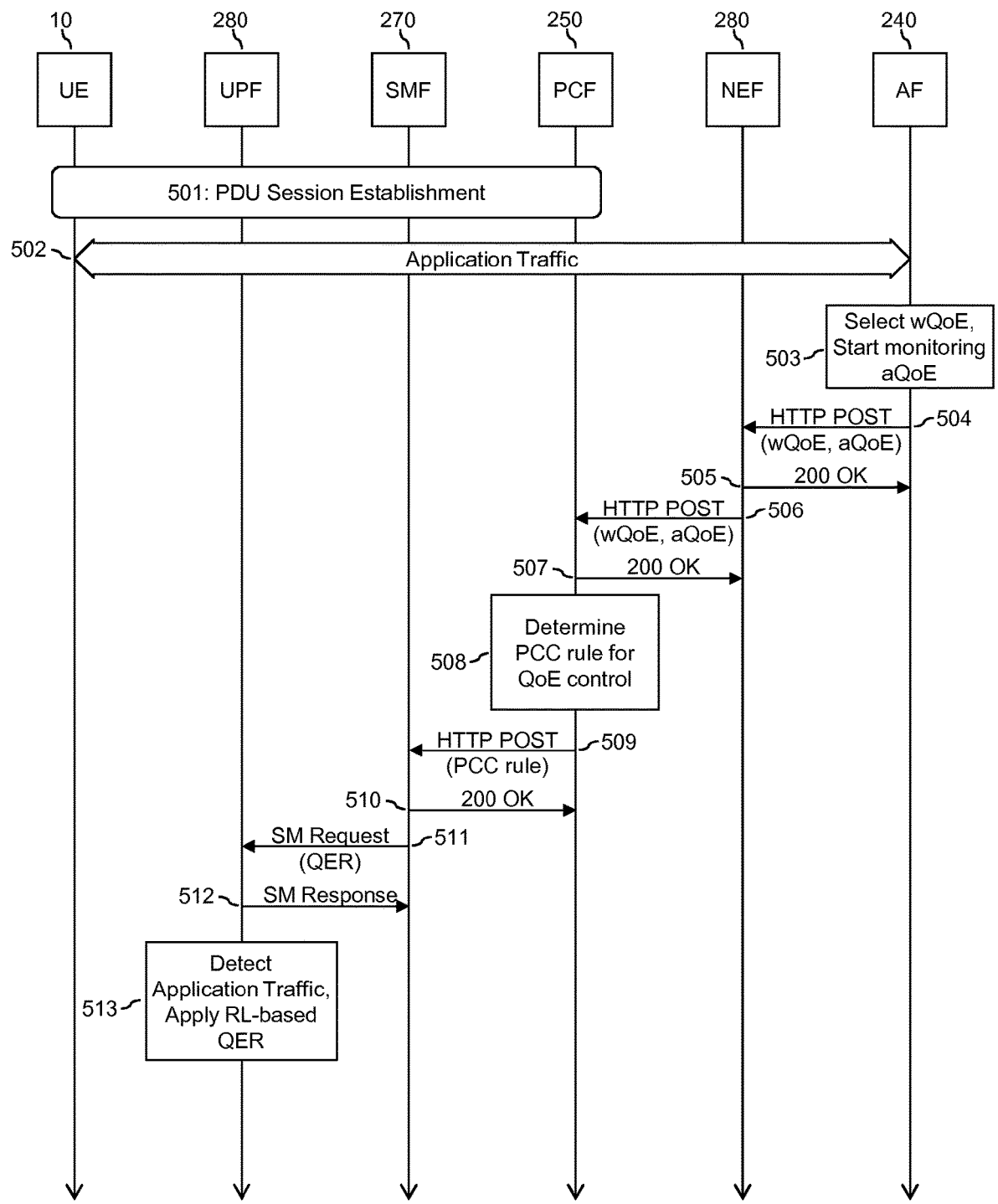
FIG. 5 illustrates an example of further processes as utilized according to an embodiment of the invention.

FIG. 5 illustrates a further example of processes which may be utilized in the illustrated concepts and involve the UE 10, the UPF 280, the SMF 270, the PCF 250, the NEF 280, and the AF 240. The processes of FIG. 5 may be used for providing information related to the QoE control from the AF 240 to the UPF 280. The processes of FIG. 5 may be performed when the UPF 280 is deployed in the wireless communication network or in response to deployment changes of the wireless communication network.

As illustrated by 501, the UE 10 first establishes a PDU session with the wireless communication network. The PDU session is used for conveying user data traffic from the UE 10. In the example of FIG. 5, it is assumed that the user data traffic includes application traffic 502 transmitted between the UE 10 and the AF 240. The application traffic 502 may for example be generated to or by a multimedia telephony application, to or by a voice telephony application, to a video streaming application, or to or by a gaming application. The AF 240 is associated with a provider of the corresponding application.

As illustrated by block 503, the AF 240 then selects the wQoE for the user data traffic of the application and starts monitoring the aQoE.

The AF 240 then initiates a procedure for setting up an AF session with required QoS with the NEF 280. As illustrated, this involves that the AF 240 sends an HTTP (Hypertext Transfer Protocol) POST message 504 via the Nnef reference point to the NEF 280. The HTTP POST message 504 includes the wQoE and optionally the aQoE monitored by the AF 240. Further, the HTTP POST message 504 may include an identifier of the application and/or a provider identifier of the application. Further, the HTTP POST message 504 may include an IP (Internet Protocol) address of the UE 10 and/or a flow description, e.g., in terms of an IP 5-tuple. If present, the aQoE may be indicated in terms of an MOS level.

The NEF 220 then acknowledges the requested AF session setup and responds with an HTTP 200 OK message 505 to the AF 240. Further, the NEF 220 may map the identifier of the application indicated by the HTTP POST message 504 to a network-internal application identifier.

The NEF 220 then interacts with the PCF 250 by sending an HTTP POST message 506 via the Npcf reference point to the PCF 250. The HTTP POST message 506 includes the wQoE and optionally the aQoE. Further, the HTTP POST message 506 may include the network-internal identifier of the application, the provider identifier, the IP address of the UE 10, and/or the flow description. The PCF 250 acknowledges the requested AF session setup and responds with an HTTP 200 OK message 507 to the NEF 220. Further, the PCF 250 identifies based on the IP address of the UE 10 that the SMF 270 is responsible for handling the PDU session of the UE 10. As illustrated by block 508, the PCF 250 also determines a PCC rule for controlling the user data traffic of the application. The PCC rule also considers the QoE control, by including the wQoE and optionally the aQoE.

For installation of the PCC rule, the PCF 250 sends an HTTP POST message 509 requesting installation of the PCC rule via the Nsmf reference point to the SMF 270. The SMF 270 then acknowledges the requested installation of the PCC rule and responds with an HTTP 200 OK message 510 to the PCF 250.

The SMF 270 then modifies the PFCP session with the UPF 280 by sending a Session Modification (SM) Request 511 via the N4 reference point to the UPF 280. The SM Request 511 may be part of a PFCP Session Modification Procedure as specified in section 6.3.3 of 3GPP TS 29.244 V16.0.0. The SM Request 511 includes one or more PDRs for detecting the the application traffic in the user data traffic, a Forwarding Action Rule (FAR), and a Quality Enforcement Rule (QER). The QER includes the wQoE and optionally also the aQoE. The UPF 280 then acknowledges the requested session modification and responds with an SM Response 512 to the SMF 270.

As indicated by block 513, the UPF 280 may then detect the application traffic based on the PDR(s). If there is a match, the application traffic is processed according to the QER, taking into account the wQoE and optionally the aQoE. This processing of the application traffic may involve processes as explained in connection with FIGS. 6A and 6B.

It is noted that if the AF 240 detects a relevant change of the aQoE, the AF 240 may trigger an update of the aQoE towards the UPF 280, by means of sending an HTTP PUT message including the updated aQoE to the NEF 220, and the NEF 220 may then forward this information via the PCF 250, and the SMF 270 to the UPF 280. Further, it is noted that while the processes of FIG. 5 involve that the wQoE and the aQoE are transmitted in the same message, it would also be possible to utilize separate messages or separate procedures for transmitting the wQoE and the aQoE. In this way, in could be taken into account that the wQoE is typically more static than the aQoE, and that updates of the aQoE could be triggered more frequently, without requiring transmission of the wQoE or other static parameters.

Figure 6A:
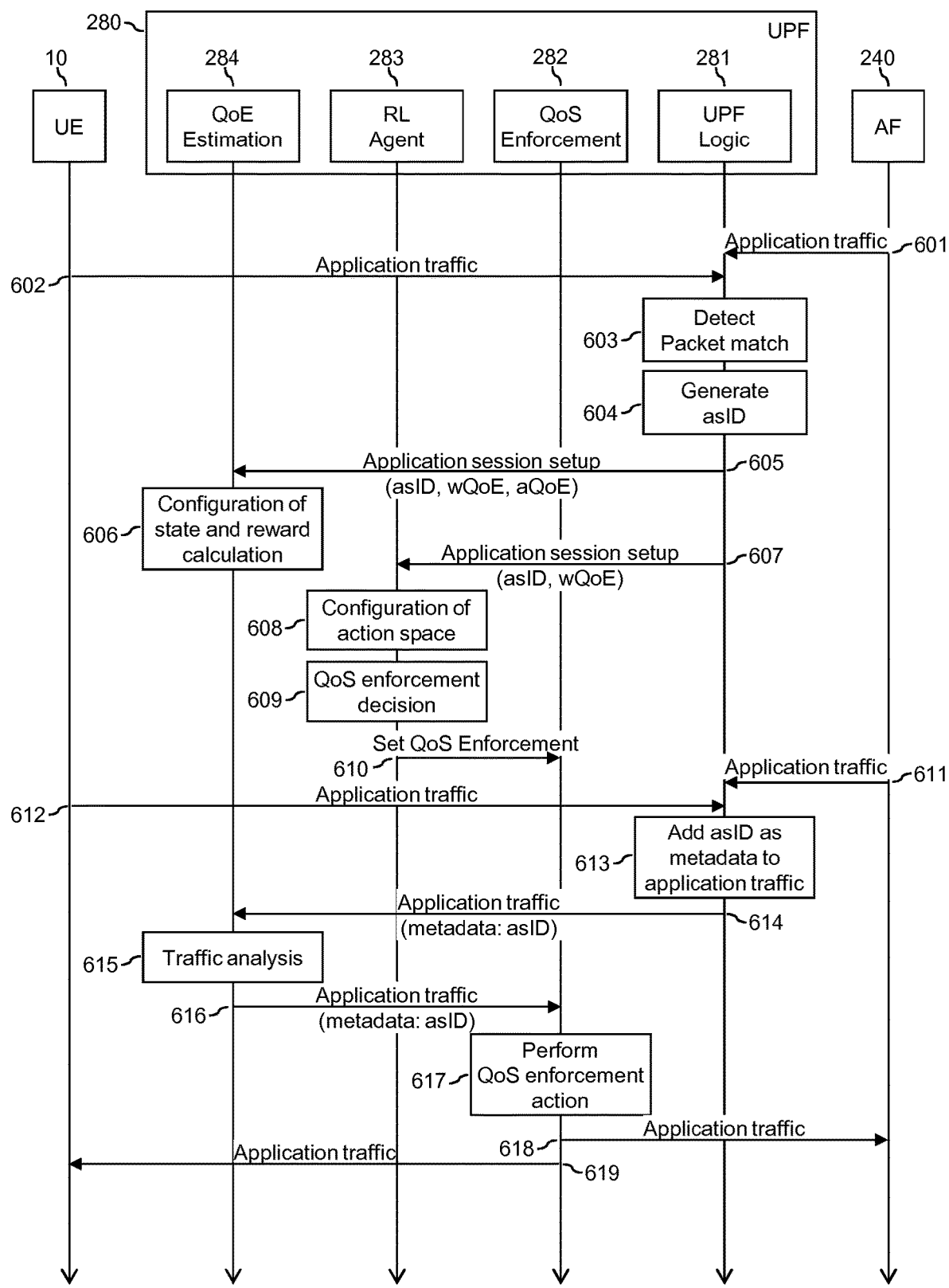
FIGS. 6A and 6B illustrate an example of further processes as utilized according to an embodiment of the invention.
Figure 6B:
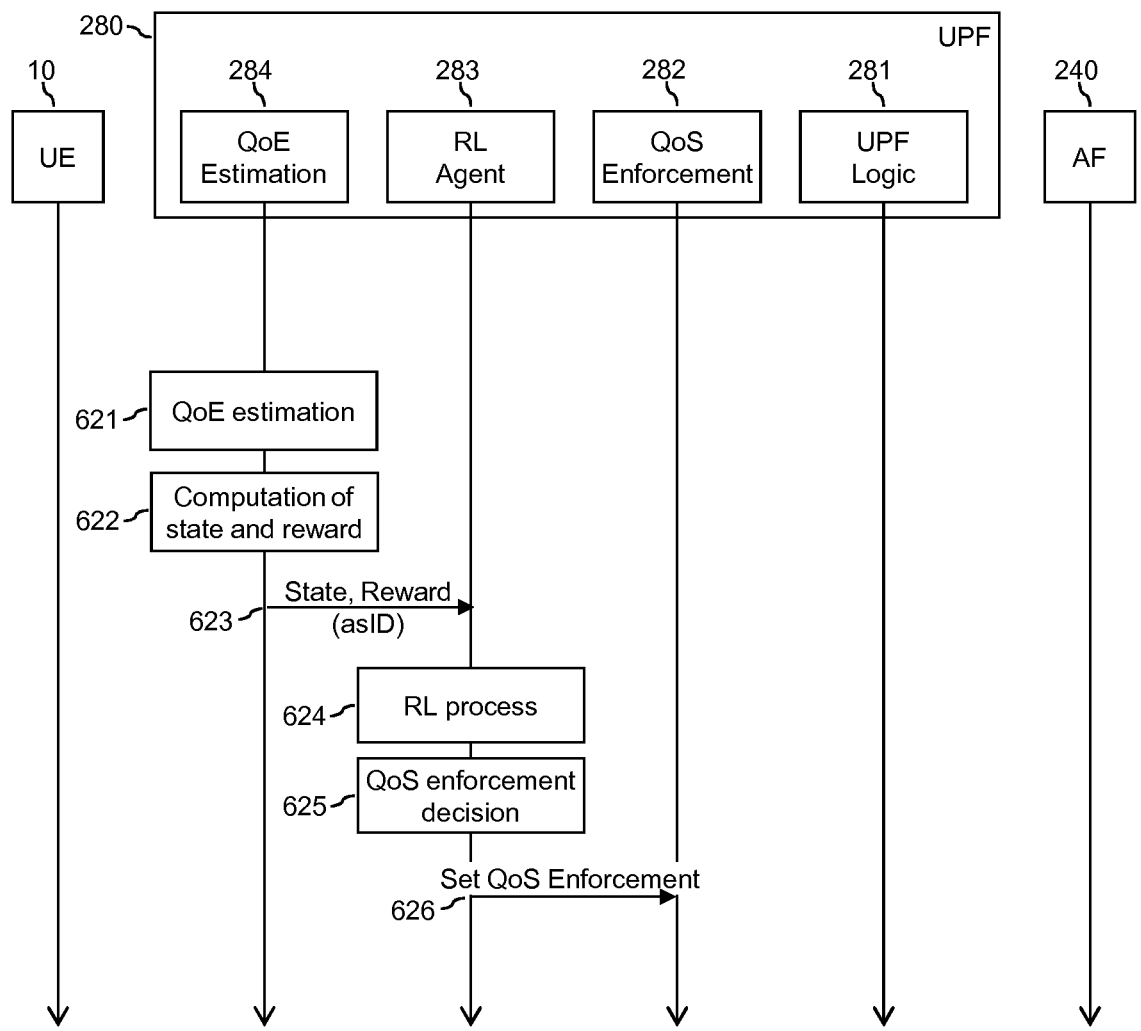

As illustrated, the processes of FIGS. 6A and 6B involve the UE 10, the UPF 280, and the AF 240. Within the UPF 280, the processes involve the UPF logic 281, the QoS enforcement module 282, the RL agent 283, and the QoE estimation module 284.

In the processes of FIG. 6A, the UPF 280 receives the application traffic 601, 602 from the AF 240 and/or the UE 10. In the UPF 280, the UPF logic 281 applies the PDR(s) to detect the application traffic 601, 602 in the user data traffic. The PDR(s) may indicate one or more IP 5-tuples for identifying matching data packets. In response to detecting a matching data packet, as illustrated by block 603, the UPF logic proceeds with the further processes of FIGS. 6A and 6B.

As illustrated by block 604, these processes include that the UPF logic 281 generates an application session identifier (asID) and stores a mapping of the IP 5-tuple matching the data packet and the asID. In this way, the asID can be identified for subsequently detected data packets matching the IP 5-tuple.

The UPF logic 281 then sends an application session setup message 605 to the QoE estimation module 284. The application session setup message 605 indicates the asID, the wQoE, and optionally the aQoE for the application traffic. In response to receiving this information, the QoE estimation module 284 configures computation algorithms for calculation of the state and the reward, as indicated by block 606. This configuration is specific for the application session identified by the asID and is based on the wQoE and optionally the aQoE.

Further, the UPF logic 281 sends an application session setup message 607 to the RL agent 283. The application session setup message 607 indicates the asID and the wQoE. In response to receiving this information, the RL agent 283 configures the QoS enforcement action space, as indicated by block 608. This configuration is based on the wQoE indicated for this application session.

The QoS enforcement action space is the set of QoS enforcement actions that are available for selection in this application session and corresponds to the action space of the RL mechanism. The QoE enforcement action space may be defined in terms of a set of QoS parameters, e.g., relating to throttling, ABR (Adaptive Bit Rate) shaping, usage of a dedicated bearer with a certain QoS or QCI (QoS Control Index). The QoS enforcement action space may be defined by defining ranges of such QoS parameters, e.g., in terms of a maximum value, a minimum value, and/or parameter step size. For example, for throttling the QoS enforcement action space could define a maximum throttling value of 1 Mbps, a minimum throttling value of 64 kbps, and a step size of to 64 kbps. When configuring the QoS enforcement action space, the wQoE may for example be considered by defining a larger step size and wider range of QoS parameters for higher values of the wQoE. That is to say, if the wQoE is high, e.g., corresponds to MOS level 5, a high step size between QoS enforcement actions can be configured, and for lower wQoE, e.g., corresponding to MOS level 3, a lower step size can be configured.

As illustrated by block 609, the RL agent 283 then takes an QoS enforcement decision, i.e., based on the wQoE, selects a QoS enforcement action from the QoS enforcement action space. This selection may also depend on whether the RL agent 283 operates in the exploration mode or the exploitation mode and on a control policy. The control policy may be pre-configured or be indicated as part of the PCC rule. Further, the control policy may be a result of RL based optimization by the RL agent 283 or by some other RL mechanism, e.g., in another UPF operating in a field environment, laboratory environment, or in a simulated environment.

As indicated by 610, the RL agent 283 then sets the QoS enforcement by the QoS enforcement module 282 in accordance with the decision of block 609. For this purpose, the RL agent indicates the asID and the selected QoS enforcement action to the QoS enforcement module 282.

The processes explained in connection with elements 603 to 610 of FIG. 6A need to be performed only for the first detected data packet that matches the PDR(s). For subsequent matching data packets the asID may be identified from the mapping stored at block 604, and the processing may be controlled in accordance with the asID, i.e., the subsequent data packets may be assigned to the existing application session and processed accordingly. In FIG. 6A, such subsequent data packets are illustrated by application traffic 611, 612 from the AF 240 and/or the UE 10.

As illustrated by block 614, upon detecting the subsequent data packets of the application traffic 611, 612, the UPF logic 281 adds the corresponding asID as metadata to the application data traffic. As illustrated by 614, the UPF logic 281 then sends the application traffic with the metadata to the QoE estimation module 284.

As indicated by block 615, the QoE estimation module 284 analyzes the application traffic, e.g., by classifying data packets and/or extracting parameters. In some scenarios, this analysis may be based on a machine learning algorithm, e.g., using the aQoE as feedback information. The QoE estimation module 284 may then collect the information obtained by the analysis for multiple data packets processed during a QoE estimation period. As illustrated by 616, the QoE estimation module 284 then provides the application traffic with the metadata indicating the asID to the QoS enforcement module 282.

As indicated by block 617, the QoS enforcement module 282 then performs QoS enforcement action corresponding to the asID on the application traffic. This specifically involves enforcing the QoS rule(s) corresponding to the QoS enforcement action. The QoS enforcement module 282 then removes the metadata with the asID and forwards the application traffic towards its destination, i.e., to the UE 10 or AF 240, as indicated by 618 and 619.

The processes explained in connection with elements 611 to 619 may be performed with respect to each data packet of the detected application data traffic.

FIG. 6B further illustrates processes used in the RL based optimization of the control policy applied by the RL agent 283 for selecting the QoS enforcement actions. The processes of FIG. 6B may be applied in the course of processing data packets as explained in connection with elements 611 to 619 of FIG. 6A.

Specifically, after having processed one or more data packets as explained in connection with elements 611 to 619 of FIG. 6A, the QoE estimation module 284 obtains a new estimate of the QoE from the information collected in the analysis of block 615, as indicated by block 621. For example, the QoE estimation module 284 may check if the QoE estimation period has ended and then evaluate the collected information. A typical duration of the QoE estimation period may be about 10 s. Alternatively or in addition, evaluation of the collected information to obtain a new estimate of the QoE could be triggered by reaching a certain number of analyzed data packets, e.g., 100 data packets. The QoE estimation module 284 may estimate the QoE in terms of a MOS level.

Based on the new estimate of the QoE, the QoE estimation module 284 then determines the new state of the environment 285 and calculates the corresponding reward, as indicated by block 622. In some scenarios, the state can be the estimate of the QoE itself. The reward could be calculated as the difference between the estimated QoE and the wQoE. However, more complex computation models could be used as well, considering other parameters such as earlier estimates of the QoE, application traffic parameters like the current application session throughput, or other parameters extracted from analysis of data packets at block 615. Further, the calculation of the reward could also use various other information available at the UPF 280, e.g., network load status. For example, the reward could be lowered in response to the network load status indicating a congestion. Further, the reward could also consider estimates of the QoE from other sources, e.g., a real-time estimate of the QoE made available to the UPF 280 by an analytics process. Here, the reward could be lowered in response to obtaining an additional estimate indicating a low QoE or the reward could be raised in response to obtaining an additional estimate indicating a high QoE.

As illustrated by 623, the QoE estimation module 284 then indicates the asID, the state, and the reward to the RL agent 283. Based on the indicated state and reward, the RL agent 283 learns the effects of the past QoS enforcement decision(s), as illustrated by block 624, and may adapt its control policy in view of optimizing future QoS enforcement decisions. This learning may involve that the RL agent determines an optimized mapping of states to QoS enforcement actions. The learning may aim at maximizing a cumulated reward of the QoS enforcement actions.

As illustrated by block 625, the RL agent 283 then takes a new QoS enforcement decision, i.e., based on the wQoE, selects a QoS enforcement action from the QoS enforcement action space. This new QoS enforcement decision is based on the adapted policy rule. Further, the new QoS enforcement decision may also depend on whether the RL agent 283 operates in the exploration mode or the exploitation mode.

As indicated by 626, the RL agent 283 then newly sets the QoS enforcement by the QoS enforcement module 282 in accordance with the decision of block 625. For this purpose, the RL agent indicates the asID and the selected QoS enforcement action to the QoS enforcement module 282.

The processing of the application traffic may then continue based on the newly set QoS enforcement, using processes as explained in connection with elements 611 to 619 of FIG. 6A.

In view of the above, the illustrated concepts provide a method which allows an AF node, e.g., the above-mentioned AF 240, to request a wireless communication network to provide a desired QoE for user data traffic of a service or application. In this method the AF node determines the desired QoE for the user data traffic. Further, the AF node may also determine an actual QoE for the user data traffic, e.g., based on QoE measurements. These QoE measurements may be performed at end points transmitting the user data traffic, e.g., the AF node and/or at a UE. The measurements may be based on various types of QoE measurement methods, including subjective methods relying on human ratings and/or objective methods using models and metrics to approximate subjective human ratings. The AF node then transmits a request for setting up an AF session with a required QoS to a PCF node, e.g., the above-mentioned PCF 250. The request is transmitted via an NEF node, e.g., the above-mentioned NEF 220. The request indicates the desired QoE and optionally also the actual QoE. In order to enable service-specific handling of the QoE control, the request may also include an identifier of the service or application, such as the above-mentioned application identifier.

The PCF node then transmits a control policy to an SMF node, e.g., the above-mentioned SMF 270. As mentioned above, this control policy may include a PCC rule, the identifier of the service or application, the desired QoE and optionally the actual QoE. The SMF node further indicates the control policy to an UPF node, e.g., the above-mentioned UPF node 280. As mentioned above, the SMF node may indicate the control policy in terms of a QER including the desired QoE and optionally the actual QoE. Further, the SMF node may also indicate a PDR for identifying the user data traffic and an FAR for the user data traffic.

Based on the indicated control policy, the UPF node detects the user data traffic and enforces one or more QoS rules to provide the wanted QoE. The selection of the QoS rules to be enforced is based on a RL mechanism which selects QoE enforcement actions each including one or more QoS rules. The RL mechanism is based on an RL agent, e.g., the above-mentioned RL agent 283, which acts on an environment provided by a QoE estimator, e.g., the above-mentioned QoE estimation module 284. The QoE estimator estimates QoE of the user traffic, which may be accomplished by monitoring characteristics of the user data traffic. For the RL mechanism, the estimated QoE represents a state of the environment. The QoE estimator further calculates a reward corresponding to the state. The calculation of the reward is based on the desired QoE and optionally on the actual QoE as indicated to the UPF node.

As mentioned above, the UPF node may assign an application session identifier, such as the asID, to the detected user data traffic and add the application session identifier to the user data traffic. The RL mechanism may then utilize this application session identifier to identify the user data traffic to be processed.

At a given time step, the RL agent select a QoE enforcement action based on the control policy. The QoE enforcement action includes one or more QoS rules to be enforced by a QoS enforcer of the UPF node, e.g., the above-mentioned QoS enforcement module 282. The RL agent may indicate the QoE enforcement action together with the application session identifier to the QoS enforcer. The QoS enforcer then enforces the QoS rule(s) corresponding to the selected QoE enforcement action on the user data traffic.

At a next time step, the QoE estimator estimates the QoE resulting from the QoE enforcement action, updates the state of the environment accordingly, and calculates the corresponding reward. The QoE estimator indicates the state and reward to the RL agent. Based on the state and the reward, the RL agent may update the control policy for selecting QoE enforcement actions, with the aim of learning an optimized control policy for selecting QoE enforcement actions.

The procedures described for the time step and the next time step may be iterated for subsequent time steps. Further, the learnt optimized control policy may be stored to be applied in an exploitation mode of the UPF node or by another UPF node.

Figure 7:
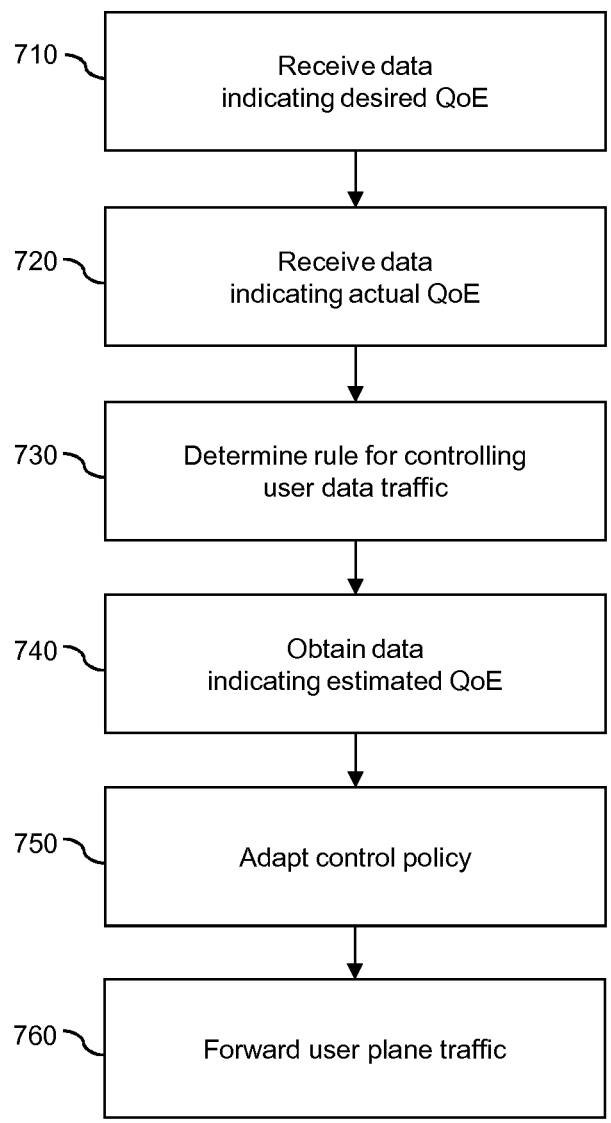
FIG. 7 shows a flowchart for illustrating a method according to an embodiment of the invention.

FIG. 7 shows a flowchart for illustrating a method of controlling user data traffic in a wireless communication network. The method of FIG. 7 may be utilized for implementing the illustrated concepts in a node which is responsible for forwarding the user data traffic to or from a UE connected to the wireless communication network, e.g., like described the above-mentioned UPF 280 or the above-mentioned GW 150, which may correspond to a UPF, a PGW, or a GGSN.

If a processor-based implementation of the node is used, at least some of the steps of the method of FIG. 7 may be performed and/or controlled by one or more processors of the node. Such node may also include a memory storing program code for implementing at least some of the below described functionalities or steps of the method of FIG. 7.

At step 710, the node receives data indicating a desired QoE level for user data traffic of a user of the wireless communication network. The desired QoE level may be user specific. The desired QoE level may also be specific to a service or application generating the user data traffic. The above-mentioned wQoE is an example of such desired QoE level. The desired QoE level may originate from a traffic endpoint generating or receiving the user data traffic, e.g., from a node providing a service or application that generates the user data traffic, such as the above-mentioned service platform 180 or AF 240.

In some scenarios, the node may receive the data indicating the desired QoE level in response to starting of a service or application generating the user data traffic, e.g., in a procedure for configuring service specific QoS handling of the user data traffic, e.g., as explained in connection with FIG. 5.

In some scenarios, the node may indicate a capability of controlling the user data traffic in accordance with the desired QoE to at least one further node of the wireless communication network, e.g., when negotiating capabilities with the at least one further node. An example of a corresponding capability indication is explained in connection with FIG. 4.

At step 720, the node may further receive data indicating an actual QoE level of the user data traffic. The actual QoE level may be user specific. The actual QoE level may also be specific to a service or application generating the user data traffic. The above-mentioned aQoE is an example of such actual QoE level. The actual QoE level can for example be measured at a traffic endpoint generating the user data traffic, e.g., at a node providing a service or application that generates or receives the user data traffic, such as the above-mentioned service platform 180 or AF 240, or at a UE 10 that generates or receives the user data traffic, such as the above-mentioned UE 10. The measurement of the actual QoE at the traffic endpoint(s) may allow for an accurate measurement of the QoE level, e.g., based on human ratings and/or based on mechanisms that approximate human ratings.

At step 730, the node determines a rule for controlling the user data traffic. This determination is based on a control policy. The rule and the control policy may be user specific. The rule and the control policy may also be specific to a service or application generating the user data traffic. The QoE enforcement decision of block 609 in FIG. 6A and the QoE enforcement decision of block 625 in FIG. 6B are examples of such determination of a rule for controlling the user data traffic. The rule determined at step 730 may include one or more QoS rules to be enforced by the node when handling the user data traffic.

At block 740, the node obtains data indicating an estimated QoE level for the user data traffic subject to control according to the rule determined at step 730. The estimated QoE level may be user specific. The estimated QoE level may also be specific to a service or application generating the user data traffic. The node may obtain the data indicating an estimated QoE level by monitoring the user data traffic and estimating the QoE based on the monitored user data traffic. That is to say, the node itself may estimate the QoE level, e.g., by using a QoE estimator like the above-mentioned QoE estimation module 284. However, the node could also receive at least a part of the data indicating the estimated QoE level from another source, e.g., from another node of the wireless communication network.

At block 750, the node adapts the control policy based on the data indicating the desired QoE level received at step 710 and the data indicating the estimated QoE level obtained at step 740. In some scenarios, the node may adapt the control policy based on the data indicating the desired QoE level received at step 710, the data indicating the actual QoE level received at step 720, and the data indicating the estimated QoE level obtained at step 740.

At block 760, the node may forward the user data traffic. In particular, the node may forward the user data traffic to or from a UE connected to the wireless communication network. When forwarding the user data traffic, the node may apply the rule determined at step 730.

In some scenarios, the node may adapt the control policy based on an RL algorithm. In such scenarios, computation of a reward of the RL algorithm may be based on the data indicating the desired QoE level received at step 710. Further, computation of a state of the RL algorithm may be based on the data indicating the estimated QoE level obtained at step 740. Further, the control rule may correspond to an action from an action space of the RL learning algorithm, such as the above-mentioned QoS enforcement actions selected by the RL agent 283. In some scenarios, computation of the reward and/or of the state of the RL algorithm may be further based on the data indicating the actual QoE level received at step 720.

Figure 8:
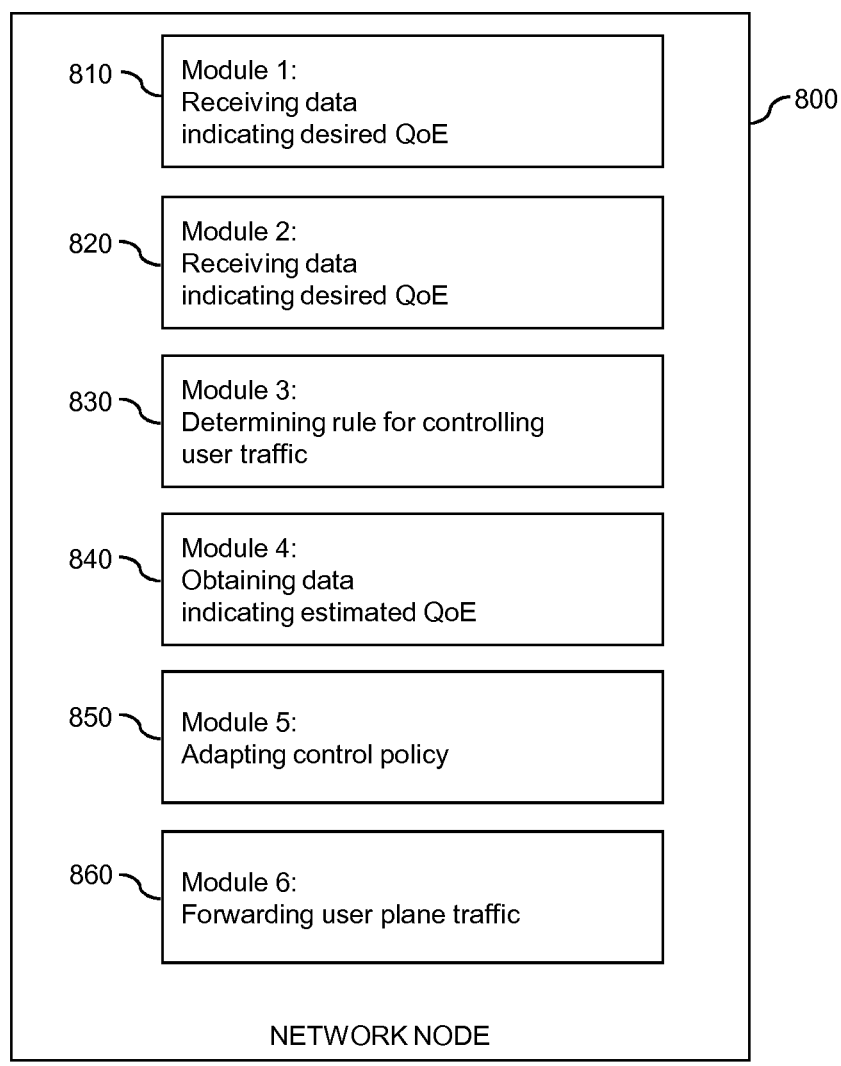
FIG. 8 shows an exemplary block diagram for illustrating functionalities of a network node implementing functionalities corresponding to the method of FIG. 7.

FIG. 8 shows a block diagram for illustrating functionalities of a network node 800 which operates according to the method of FIG. 7. The network node 800 may for example correspond to a user plane gateway, such as the above-mentioned GW 150 or the above-mentioned UPF 280. As illustrated, the network node 800 may be provided with a module 810 configured to receive data indicating a desired QoE level, such as explained in connection with step 710. Further, the network node 800 may be provided with a module 820 configured to receive data indicating an actual QoE level, such as explained in connection with step 720. Further, the network node 800 may be provided with a module 830 configured to determine a rule for controlling user data traffic, such as explained in connection with step 730. Further, the network node 800 may be provided with a module 840 configured to obtain data indicating an estimated QoE, such as explained in connection with step 740. Further, the network node 800 may be provided with a module 850 configured to adapt a control policy, such as explained in connection with step 750. Further, the network node 800 may be provided with a module 860 configured to forward user data traffic, such as explained in connection with step 760.

It is noted that the network node 800 may include further modules for implementing other functionalities, such as known functionalities of a user plane gateway of a wireless communication network. Further, it is noted that the modules of the network node 800 do not necessarily represent a hardware structure of the network node 800, but may also correspond to functional elements, e.g., implemented by hardware, software, or a combination thereof.

Figure 9:
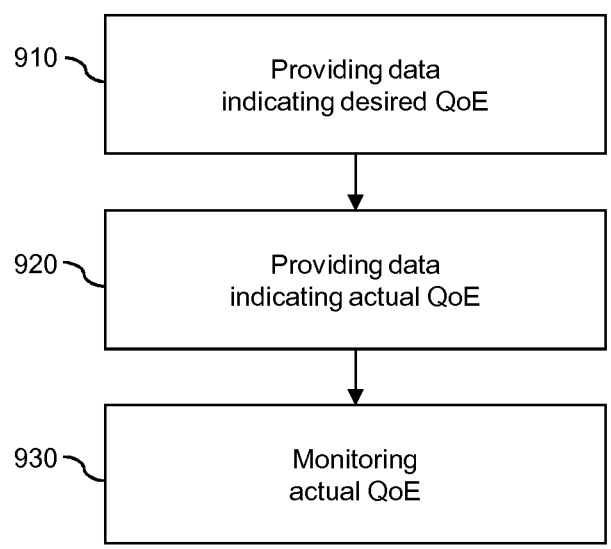
FIG. 9 shows a flowchart for illustrating a further method according to an embodiment of the invention.

FIG. 9 shows a flowchart for illustrating a method of controlling user data traffic transmission in a wireless communication network. The method of FIG. 9 may be utilized for implementing the illustrated concepts in a node that interacts with one or more other nodes of the wireless communication network to enable control of the user data traffic with respect to QoE, such as the above-mentioned controller 160, service platform 180, NEF 220, AF 240, PCF 250, or SMF 270. In some scenarios, the node may correspond to a traffic endpoint of the user data traffic, e.g., to the above-mentioned service platform 180 or AF 240.

If a processor-based implementation of the node is used, at least some of the steps of the method of FIG. 9 may be performed and/or controlled by one or more processors of the node. Such node may also include a memory storing program code for implementing at least some of the below described functionalities or steps of the method of FIG. 9.

At step 910, the node provides data to a further node of the wireless communication network. The data indicate a desired QoE level for user data traffic of a user of the wireless communication network. The further node may be a node that is responsible for forwarding the user data traffic to or from a UE connected to the wireless communication network, e.g., like described the above-mentioned UPF 280 or the above-mentioned GW 150, which may correspond to a UPF, a PGW, or a GGSN. In some scenarios, the node may provide the data indirectly via other nodes to the further node.

The desired QoE level may be user specific. The desired QoE level may also be specific to a service or application generating the user data traffic. The above-mentioned wQoE is an example of such desired QoE level. The desired QoE level may originate from a traffic endpoint generating or receiving the user data traffic, e.g., from a node providing a service or application that generates the user data traffic, such as the above-mentioned service platform 180 or AF 240.

At step 920, the node provides further data to the further node. The further data indicate an actual QoE for the user data traffic. In some scenarios, the node may provide the data indirectly via other nodes to the further node. The actual QoE level may be user specific. The actual QoE level may also be specific to a service or application generating the user data traffic. The above-mentioned aQoE is an example of such actual QoE level. The actual QoE level can for example be measured at a traffic endpoint generating the user data traffic, e.g., at a node providing a service or application that generates or receives the user data traffic, such as the above-mentioned service platform 180 or AF 240, or at a UE 10 that generates or receives the user data traffic, such as the above-mentioned UE 10. The measurement of the actual QoE at the traffic endpoint(s) may allow for an accurate measurement of the QoE level, e.g., based on human ratings and/or based on mechanisms that approximate human ratings.

The data and the further data provided to the further node may enable RL-based QoE control by the further node.

At step 930, the node may monitor the actual QoE level. If the node corresponds to a traffic endpoint of the user data traffic, this monitoring may be based on user data traffic generated by the node and/or based on user data traffic received by the node.

In some scenarios, the node may receive an indication of a capability of the further node to control the user data traffic in accordance with the desired QoE level. In this case, the node perform the steps 910, 920 of providing the data and the further data to the further node in response to receiving the indication.

Figure 10:
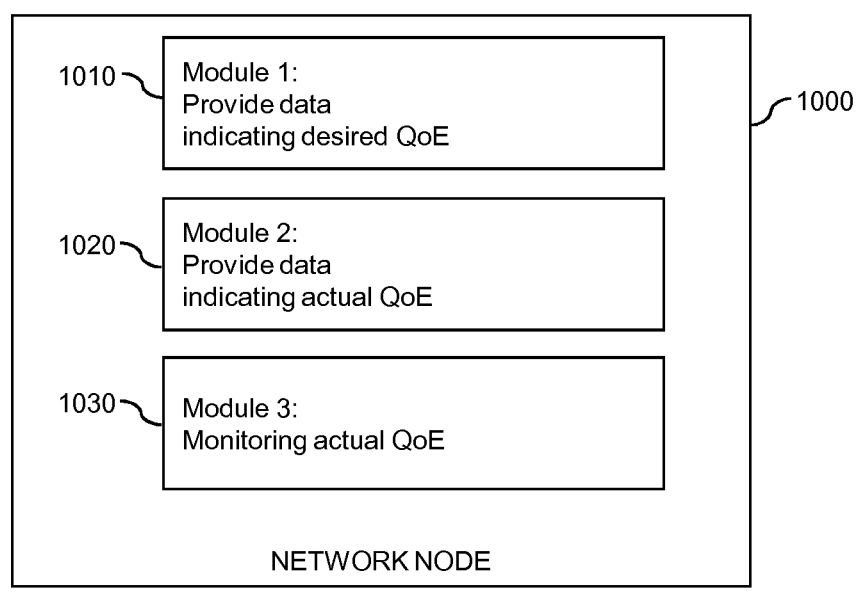
FIG. 10 shows an exemplary block diagram for illustrating functionalities of a network node implementing functionalities corresponding to the method of FIG. 9.

FIG. 10 shows a block diagram for illustrating functionalities of a network node 1000 which operates according to the method of FIG. 9. The network node 1000 may for example correspond to a node that interacts with one or more other nodes of the wireless communication network to enable control of the user data traffic with respect to QoE, such as the above-mentioned controller 160, service platform 180, NEF 220, AF 240, PCF 250, or SMF 270. In some scenarios, the node may correspond to a traffic endpoint of the user data traffic, e.g., to the above-mentioned service platform 180 or AF 240. As illustrated, the network node 1000 may be provided with a module 1010 configured to provide data indicating a desired QoE to a further node, such as explained in connection with step 910. Further, the network node 1000 may be provided with a module 1020 configured to provide further data indicating an actual QoE to the further node, such as explained in connection with step 920. Further, the network node 1000 may be provided with a module 1030 configured to monitor the actual QoE, such as explained in connection with step 930.

It is noted that the network node 1000 may include further modules for implementing other functionalities, such as known functionalities of an AF, NEF, PCF, SMF or similar node. Further, it is noted that the modules of the network node 1000 do not necessarily represent a hardware structure of the network node 1000, but may also correspond to functional elements, e.g., implemented by hardware, software, or a combination thereof.

Further, it is noted that the functionalities described in connection with FIGS. 7 to 10 may also be combined in a system including a node operating according to the method of FIG. 9 and a further node operating according to the method of FIG. 7. In such system, the data received at step 710 may correspond to the data provided at step 910, and the data received at step 720 may correspond to the data provided at step 920.

Figure 11:
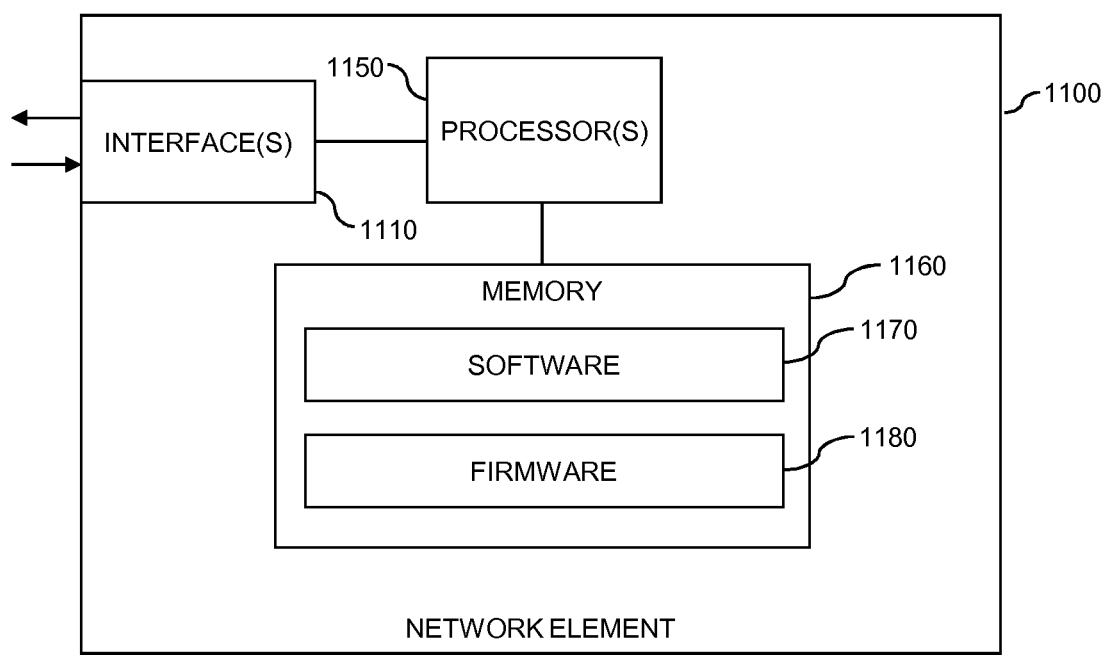
FIG. 11 schematically illustrates structures for implementing a network node according to an embodiment of the invention.

FIG. 11 illustrates a processor-based implementation of a network element 1100 which may be used for implementing the above-described concepts. For example, the structures as illustrated in FIG. 11 may be used for implementing any of the above-described nodes 150, 160, 180, 220, 240, 250, 270, 280. In some scenarios, also a system of multiple network elements 1100 with structures as illustrated in FIG. 11 may be used for implementing any of the above-described nodes 150, 160, 180, 220, 240, 250, 270, 280.

As illustrated, the network element 1100 includes one or more interfaces 1110. These interfaces may for example be used for enabling communication with other node. The interfaces may for example be used for implementing one or more of the reference points shown in FIG. 2.

Further, the network element 1100 may include one or more processors 1150 coupled to the interface(s) 1110 and a memory 1160 coupled to the processor(s) 1150. By way of example, the interface(s) 1110, the processor(s) 1150, and the memory 1160 could be coupled by one or more internal bus systems of the network element 1100. The memory 1160 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1170 and/or firmware 1180. The memory 1160 may include suitably configured program code to be executed by the processor(s) 1150 so as to implement the above-described functionalities of a network node, such as explained in connection with FIGS. 7 to 10.

It is to be understood that the structures as illustrated in FIG. 11 are merely schematic and that the network element 1100 may actually include further components which, for the sake of clarity, have not been illustrated, e.g., further interfaces or processors. Also, it is to be understood that the memory 1160 may include further program code for implementing known functionalities of a network element, e.g., known functionalities of a control plane or user plane nodes of a 3GPP network. According to some embodiments, also a computer program may be provided for implementing functionalities of the network element 1100, e.g., in the form of a physical medium storing the program code and/or other data to be stored in the memory 1160 or by making the program code available for download or by streaming.

As can be seen, the concepts as described above may be used for efficiently controlling user data traffic with respect to QoE. In particular, a service or application provider may provide the wireless communication network with information on a desired QoE level and optionally also the actual QoE level of user data traffic, thereby enabling the wireless communication network to control the user data traffic with the aim of achieving the desired QoE level. The latter control may be accomplished in an efficient way by utilizing an RL mechanism. As a result, static configurations of QoS may be avoided and adaptation to changing conditions or individual characteristics of involved nodes or deployment scenarios may be facilitated. Further, the amount of required human intervention may be reduced. Still further, QoE control may also be enabled for encrypted user data traffic.

It is to be understood that the examples and embodiments as explained above are merely illustrative and susceptible to various modifications. For example, the illustrated concepts may be applied in connection with various wireless communication network technologies, without limitation to the NR technology. For example, when using the LTE technology, functionalities as explained for the gateway 150 and the UPF 280 could be implemented by a PGW of the LTE technology, and the PDU session could correspond to a PDN (Packet Data Network) connection. Further, when using the UMTS technology, the functionalities as explained for the gateway 150 and the UPF 280 could be implemented by a GGSN of the UMTS technology, and the PDU session could correspond to a Radio Access Bearer.

Further, it is noted that the exploration mode and exploitation mode of the RL agent could be used in different environments. For example, the exploration mode could be used in a controlled environment, e.g., a laboratory, while the exploitation mode could be used in a field environment, during operation at a deployment site. In some scenarios, it is also possible to apply a control policy learnt by an RL agent of a certain node in another node. Another possibility is to use existing production data to pre-train the RL agent. This may be utilized to avoid extensive exploration phases in a field environment.

Further, the concepts may be applied with respect to various types of machine learning algorithms, without limitation to RL algorithms. Moreover, it is to be understood that the above concepts may be implemented by using correspondingly designed software to be executed by one or more processors of an existing device or apparatus, or by using dedicated device hardware. Further, it should be noted that the illustrated nodes may each be implemented as a single device or as a system of multiple interacting devices or modules, e.g., as a cloud system.

The invention claimed is:

1. A method in a first node of controlling user data traffic in a wireless communication network, the method comprising:
    receiving from a session management function (SMF) a session modification (SM) request and a desired quality of experience (QoE) level for user data traffic of a user of the wireless communication network, the SM request including a quality enforcement rule (QER);
    determining an estimated QoE level for the user data traffic subject to the QER;
    adapting the QER based at least in part on a reward obtained from a reinforced learning process applied to the desired QoE level and the estimated QoE level; and
    applying the adapted QER to the user data traffic.

2. The method according to claim 1, comprising:
    estimating the QoE level for the user data traffic subject to control according to the QER.

3. The method according to claim 1, comprising:
    receiving data indicating an actual QoE level for the user data traffic; and
    adapting a control policy based on the received data.

4. The method according to claim 3, wherein computation of the reward of the reinforced learning process is further based on received data.

5. The method according to claim 1, further comprising adapting a control policy based on the reinforced learning process, and wherein computation of the reward of the reinforced learning process is based on first data, computation of a state of the reinforced learning process is based on second data, and a control rule corresponds to an action from an action space of the reinforced learning process.

6. The method according to claim 1, wherein the desired QoE level is user specific.

7. The method according to claim 1, wherein the user data traffic is generated by one or more services and the desired QoE level is service specific.

8. The method according to claim 1, further comprising receiving first data in response to starting of a service generating the user data traffic.

9. The method according to claim 8, wherein the first data originates from a provider of a service generating the user data traffic.

10. The method according to claim 1, comprising:
    indicating a capability of controlling the user data traffic in accordance with the desired QoE level to at least one further node of the wireless communication network.

11. The method according to claim 1, comprising:
    forwarding the user data traffic to or from a user equipment connected to the wireless communication network.

12. The method according to claim 1, wherein the first node includes at least one of a General Packet Data Service Gateway Support Node, GGSN, a Packet Data Gateway, PGW, and a User Plane Function, UPF of a $3^{rd}$ Generation Partnership Project, 3GPP, technology.

13. A method in a first node of controlling user data traffic in a wireless communication network, the method comprising:
    indicating to a second node of the wireless communication system, a session modification (SM) request and a desired quality of experience level for user data traffic of a user of the wireless communication network, the SM request including a quality enforcement rule (QER);
    sending an adapted QER to the second node, the adapted QER being based at least in part on a reward obtained at the second node from a reinforced learning process applied to the desired QoE level and the estimated QoE level; and
    indicating to the second node an actual QoE level for the user data traffic, the actual QoE level being based at least in part on the adapted QER.

14. The method according to claim 13, comprising:
    monitoring the actual QoE level.

15. The method according to claim 14, comprising:
    monitoring the actual QoE level based on at least one of user data traffic generated by the second node and user data traffic received by the second node.

16. The method according to claim 13, comprising:
    receiving an indication of a capability of the second node to control the user data traffic in accordance with the desired QoE level; and
    in response to the indication, providing data to the second node, the data indicating the actual QoE level.

17. The method according to claim 13, wherein the second node is configured to forward the user plane traffic to or from a user equipment connected to the wireless communication network.

18. The method according to claim 13, wherein the second node includes at least one of a General Packet Data Service Gateway Support Node, GGSN, a Packet Data Gateway, PGW, and a User Plane Function, UPF, of a 3rd Generation Partnership Project technology.

19. A node for a wireless communication network, the node being configured to:
    receive first data indicating a desired quality of experience (QoE) level for user data traffic of a user of the wireless communication network and a quality enforcement rule (QER);
    determine an estimated QoE level for the user data traffic subject to the QER; and
    adapt the QER based at least in part on a reward obtained from a reinforced learning process applied to the desired QoE level and the estimated QoE level; and
    apply the adapted QER to the user data traffic.

20. A first node for a wireless communication network, the node being configured to:
    indicate to a second node of the wireless communication network, a session modification (SM) request and a desired quality of experience QoE level for user data traffic of a user of the wireless communication network, the SM request including a quality enforcement rule (QER);
    send an adapted QER to the second node, the adapted QER being based at least in part on a reward obtained from a reinforced learning process applied to the desired QoE level and the estimated QoE level; and indicate to the second node an actual quality of experience QoE level for the user data traffic, the actual QoE level being based at least in part on the adapted QER.

* * * * *